A. L. GERSDORFF.
TEMPERATURE INDICATING DEVICE.
APPLICATION FILED OCT. 12, 1920.

1,393,279.

Patented Oct. 11, 1921.

INVENTOR.
A. L. Gersdorff
BY
ATTORNEY.

UNITED STATES PATENT OFFICE.

ALBERT L. GERSDORFF, OF BARTLESVILLE, OKLAHOMA.

TEMPERATURE-INDICATING DEVICE.

1,393,279.   Specification of Letters Patent.   Patented Oct. 11, 1921.

Application filed October 12, 1920. Serial No. 416,366.

*To all whom it may concern:*

Be it known that I, ALBERT L. GERSDORFF, a citizen of the United States of America, residing at Bartlesville, in the county of Washington and State of Oklahoma, have invented certain new and useful Improvements in Temperature-Indicating Devices, of which the following is a specification.

This invention relates to temperature indicating devices and has special reference to a thermometer for taking the temperature of liquid and at the same time obtaining a sample of the liquid the temperature of which is taken, the device being preferably termed a thief thermometer.

One important object of the invention is to provide an improved structure wherein a sample of liquid, such as oil or the like, may be taken from a tank at any desired depth therein and at the same time an indication be obtained of the temperature of the sample at the time it is taken.

Another important object of the invention is the provision of a device of this character having an improved construction wherein the temperature of the sample taken will be maintained during the withdrawal of the sample so that the indication on the thermometer will be a true indication of the sample temperature at the time the sample is taken.

A third important object of the invention is the provision of an improved device of this character wherein a single suspension means may be utilized for both lowering and hoisting the device and for actuating certain valve means to admit the desired sample being taken.

With the above and other objects in view the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1:
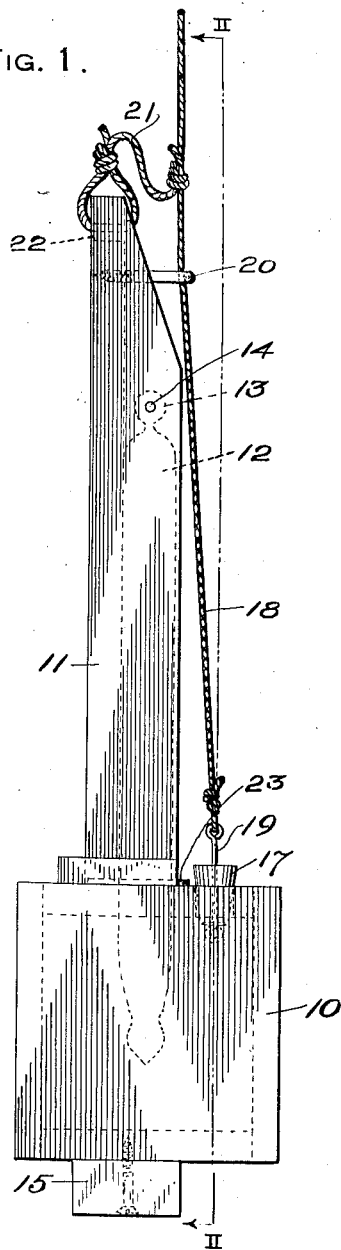
Figure 1 is a side elevation of a device constructed in accordance with this invention.
Figure 2:
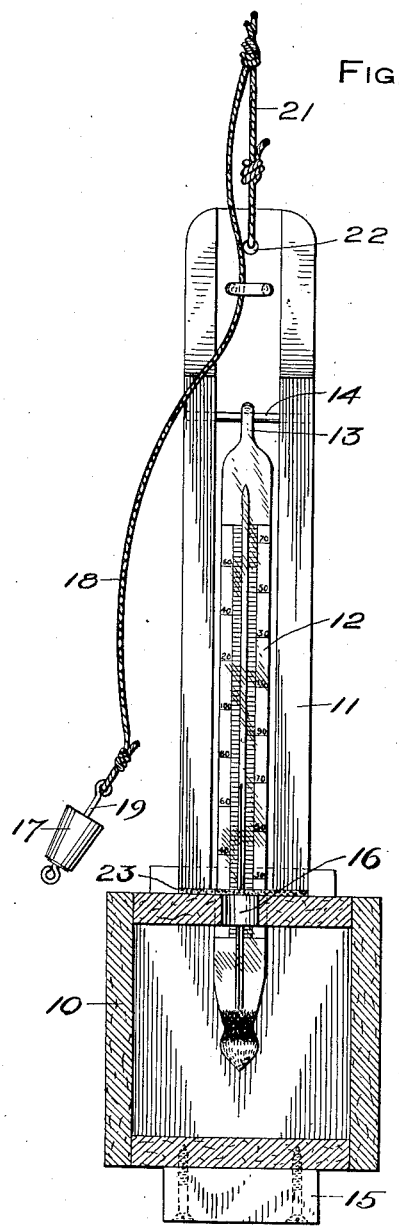
Fig. 2 is a section on line II—II of Fig. 1, the valve means, shown closed in the former figure, being shown open in this figure.

In the embodiment of the invention herein illustrated there is provided a box or casing 10 the walls of which are formed of some heat insulating material and this casing has extending upward therefrom a channeled standard 11 between the flanges of which is located a thermometer 12 having at its upper end an eye 13 through which passes a pin 14, the pin having its ends embedded in the flanges of the channel 11. By this means the thermometer is prevented from movement vertically in the channel. The lower end of this thermometer extends into the casing 10 through an opening in the top of the casing, the opening being of such dimensions that a tight fit exists between the thermometer and the casing top so that no fluid can enter around the thermometer nor air escape therearound. Beneath the casing 10 is secured a weight 15 sufficient to sink the device in the fluid to be tested.

In the present instance the simplest sort of valve means is shown and the valve means illustrated consists in an opening 16 formed in the top of the casing 10 and a plug or cork 17 of proper size to fit closely in the opening when inserted therein and to be held by friction in the opening sufficiently tight so that a cord 18 connected to a stem 19 passing through the plug may be used to suspend the device as illustrated in Fig. 1. In order to keep the device from toppling over the cord 18 is led through a loop or staple 20 projecting from the standard 11. While the plug 17 will, under ordinary circumstances, frictionally sustain the weight of the device yet, if a sharp jerk be given to the cord, the plug may be withdrawn. In that event the device might sink to the bottom of the tank or at any rate to a point considerably below that at which it was desired to take the sample. In order to overcome this the cord 18 has connected thereto a cord 21 which is secured to the top of the standard 11, passing through an opening 22 for this purpose as shown. Attention is called to the fact that a suitable packing gasket 23 may be placed around the thermometer 12 at the point where it passes through the top of the casing 10 thus making certain that no leakage will take place at this point.

In operation, the casing being empty, the plug 17 is inserted and the device lowered into the fluid to be tested to the required depth. Upon reaching this point a sharp jerk is given to the cord 18. This causes the plug 17 to be withdrawn thus opening the casing 10. Immediately the fluid enters through the opening 16 and fills the casing 10. The thermometer will then indicate the temperature of the fluid which has entered the casing, this being a sample from the point desired. It is advisable to allow the device to rest quietly in the fluid for a short time in order for the thermometric column to come to rest. The device may then be withdrawn by means of the cord and, owing to the fact that the walls of the casing 10 are of heat insulating material, the temperature of the sample taken will be maintained during the passage of the device upward through the body of the fluid and will also be maintained for a considerable period of time after the device is in the operator's hands so that the temperature can be read and this temperature will be that of the layer of fluid from which the sample was taken.

There has thus been provided a simple and efficient device of the kind described and for the purpose specified.

It is obvious that minor changes may be made in the form and construction of this invention without departing from the material principles thereof. It is not therefore desired to confine the invention to the exact form shown and described but it is wished to include all such as properly come within the scope claimed.

It is to be understood that a maximum or minimum thermometer may be used in place of the plain thermometer shown.

Having thus described the invention, what is claimed as new is:—

1. In a device of the kind described, a sample receptacle comprising a casing formed of a heat insulated material and having valve means to afford access to the interior of the casing, a thermometer extending into said casing and having its bulb entirely surrounded thereby and suspension means for the casing.

2. In a device of the kind described, a sample receptacle comprising a casing formed of heat insulating material having valve means to afford access to the casing, a thermometer extending into the casing, suspension means connected to said valve means and arranged to open the valve upon a required pull being given the suspension means, and a normally slack connection between the suspension means and a fixed part of the device.

3. In a device of the kind described, a hollow casing having an opening in the top thereof, a plug frictionally engageable in said opening to close the same, a suspension cord connected to and adapted to withdraw said plug, a thermometer extending through the wall of the casing, and a flexible strand connecting cord and a fixed part of the device and arranged to be loose when the plug is engaged in said opening.

4. In a device of the kind described, a hollow casing having an opening in the top thereof, a channel shaped standard fixed to and extending upward from the casing, a thermometer mounted between the flanges of said standard and projecting into the casing, a plug for said opening, a suspension cord attached to said plug, and a normally loose connection between the cord and the top of the standard.

5. In a device of the kind described, a hollowing casing formed of heat insulating material having an opening in the top thereof, a plug frictionally engageable in said opening to close the same, a suspension cord connected to and adapted to withdraw said plug, a thermometer extending through the wall of the casing, and a flexible strand connecting cord and a fixed part of the device and arranged to be loose when the plug is engaged in said opening.

6. In a device of the kind described, a hollow casing formed of heat insulating material having an opening in the top thereof, a channel shaped standard fixed to and extending upward from the casing, a thermometer mounted between the flanges of said standard and projecting into the casing, a plug for said opening, a suspension cord attached to said plug, and a normally loose connection between the cord and the top of the standard.

In testimony whereof I affix my signature.

ALBERT L. GERSDORFF.